United States Patent [19]
Christophe et al.

[11] Patent Number: 5,378,363
[45] Date of Patent: Jan. 3, 1995

[54] FLUID FILTER

[76] Inventors: Théophile Christophe, 9, rue Mozart, 78330 Fontenay le Fleory; Jean-Claude Moatti, 25-27, rue des Fleurs, 92150 Suresnes, both of France

[21] Appl. No.: 901,245

[22] Filed: Jun. 19, 1992

[30] Foreign Application Priority Data

Jun. 20, 1991 [FR] France .................. 91 07599

[51] Int. Cl.$^6$ .................................. B01D 29/56
[52] U.S. Cl. .................................. 210/314; 210/316; 210/333.01; 210/DIG. 13
[58] Field of Search ............ 210/314, 316, 297, 324, 210/331, 332, 333.01, 335, DIG. 13

[56] References Cited

U.S. PATENT DOCUMENTS

| | | | |
|---|---|---|---|
| 2,545,374 | 3/1951 | Nugent | 210/DIG. 13 |
| 3,994,810 | 11/1976 | Schaeffer | 210/333.1 |
| 4,038,189 | 7/1977 | Dison et al. | 210/DIG. 13 |
| 4,481,111 | 11/1984 | Christophe et al. | 210/333.01 |
| 4,587,017 | 5/1986 | Christophe et al. | 210/333.01 |
| 4,592,838 | 6/1986 | Christophe et al. | 210/333.01 |
| 4,702,833 | 10/1987 | Miyata | 210/333.01 |
| 4,925,557 | 5/1990 | Ahlberg et al. | 210/333.01 |
| 5,078,877 | 1/1992 | Cudaback et al. | 210/DIG. 13 |
| 5,217,606 | 6/1993 | Ramponi et al. | 210/DIG. 13 |

FOREIGN PATENT DOCUMENTS

| | | |
|---|---|---|
| 0149931 | 11/1984 | European Pat. Off. . |
| 0382202 | 2/1990 | European Pat. Off. . |
| 2631597 | 7/1976 | Germany . |
| 2757447 | 7/1979 | Germany . |

*Primary Examiner*—Thomas Wyse
*Attorney, Agent, or Firm*—Poms, Smith, Lande & Rose

[57] ABSTRACT

A fluid filter, preferably having a filter body, a first and second filtration assembly contained within the filter body and a cleaning device also contained within the filter body. The first and second filtration assemblies have at least one filtering element and have an enclosure for receiving the filtered fluid, the enclosure being separated from the rest of the filter by the filtering elements of the first and second filtration assemblies. The cleaning device periodically cleans the filtering elements of the first and second filtration assemblies and has an enclosure for receiving the residues of cleaning from the filtering elements of the first and second filtration assemblies, the enclosure being separated from the filtering elements of the first and second filtration assemblies and having a permanent opening for evacuating the residues of cleaning. The filtering elements of the first and second filtration assemblies present notably different filtration calibrations.

6 Claims, 2 Drawing Sheets

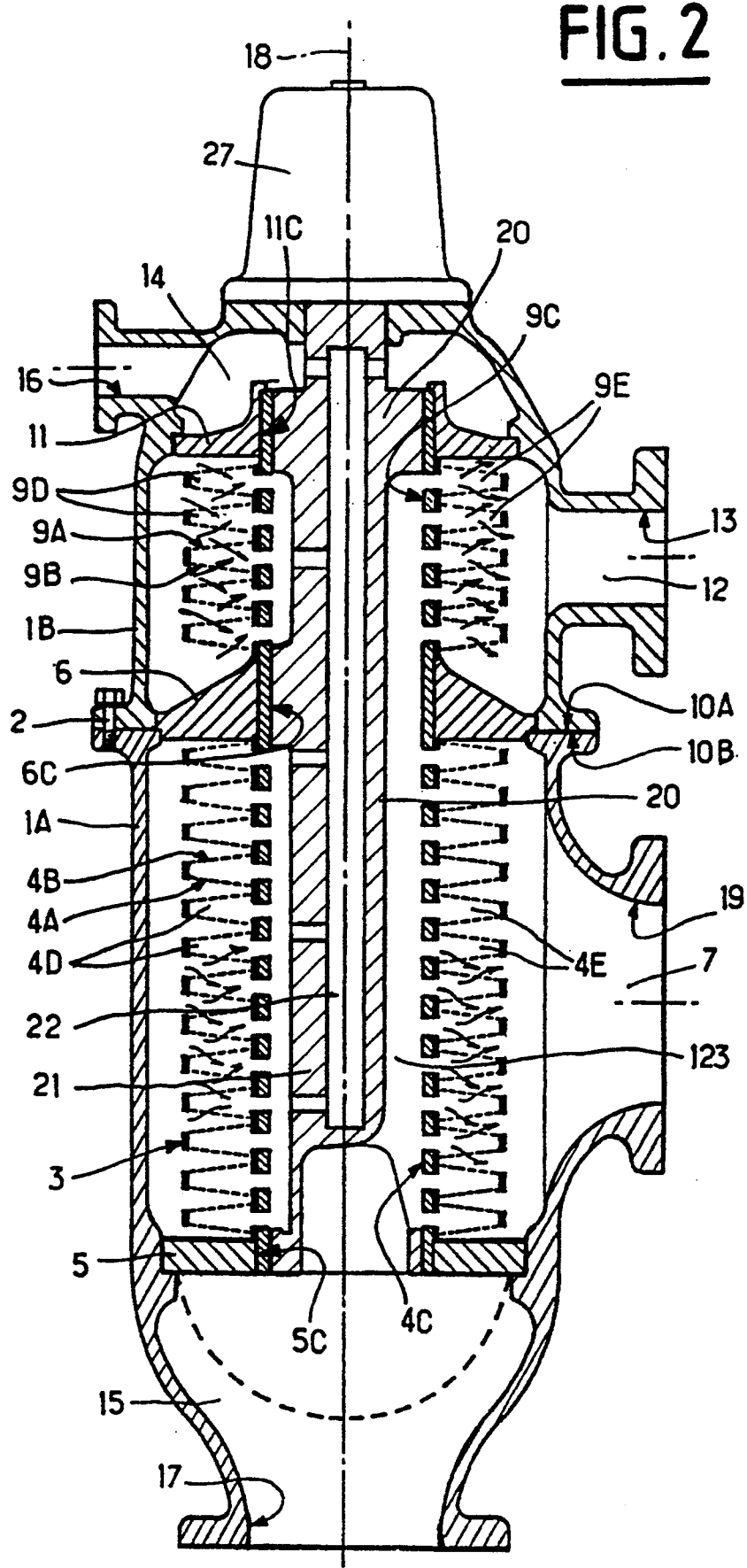

FLUID FILTER

FIELD OF THE INVENTION

The present invention relates to a fluid filter.

BACKGROUND OF THE INVENTION

A fluid filter is already known, comprising a filter body provided with a principal connection for admission of a fluid to be filtered and, contained inside said filter body: an enclosure for admission of the fluid to be filtered into which said admission connection opens out; a first filtration assembly comprising filtering elements and a first enclosure for receiving the filtered fluid, separated from the rest of the filter by said filtering elements of said first filtration assembly; a second filtration assembly comprising filtering elements and a second enclosure for receiving the filtered fluid, separated from the rest of the filter by said filtering elements of said second filtration assembly; and a device for periodically cleaning the filtering elements of each of said first and second filtration assemblies comprising at least one enclosure for receiving the residues of cleaning from said filtering elements.

FR-A-2 554 735 discloses such a fluid filter, in which the function of the second filtration assembly is to receive the fluid laden with impurities coming from the periodic cleaning of the filtering elements of the first filtration assembly and to ensure filtration thereof. The filtered fluid issuing from the filtration effected by this second filtration assembly presents, in the known filter, substantially the same quality of filtration as that issuing from the principal filtration effected by the first filtration assembly, and is re-introduced in the circuit of the purified fluid. With one filter, the user may thus treat both the principal flow to be filtered and also the secondary flow issuing from the periodic cleaning of the filtering elements of the first filtration assembly.

Requirements concerning filtration have developed and it is admitted at the present time to employ, in certain uses, two distinct filters to make the two filtrations mentioned above. On the other hand, there are uses where it would be valuable, in order to be able to supply %he same machine with purified fluid, to have available a fluid presenting two qualities of purification, if possible by means of the same filter. For example, certain internal combustion engines, of the "Diesel" type, provided with a turbocharger, present double lubrication circuits, for lubrifying, on the one hand, the engine itself, on the other hand, its turbo-compressor. The qualities of filtration are different, the engine admitting a screening of 35 microns, whilst the turbo-compressor requires a screening at the most equal to 20 microns, for example.

By adapting the known filters, it becomes possible, with one sole filter, to obtain the desired flows of filtered fluid, with the desired qualities of filtration.

SUMMARY OF THE INVENTION

The invention has for an object such adaptation and it therefore relates to a filter in which: a) the receiving enclosure of the periodic cleaning device is separated from each of said first and second enclosures for receiving the filtered fluid and is connected to a connection for evacuating the residues of cleaning; and b) the filtering elements of the first and second filtration assemblies present notably different filtration calibrations.

The following advantageous arrangements are, in addition, preferably adopted:

said filtration calibrations are in a ratio of 1 to at least 1.4;

the first filtration assembly comprises a first connection for admission of the fluid to be filtered, which communicates directly with the enclosure for admission of the fluid to be filtered, whilst the second filtration assembly comprises a second connection for admission of the fluid to be filtered, which communicates with the first enclosure for receiving the filtered fluid;

the first and second filtration assemblies respectively comprise first and second connections for admission of the fluid to be filtered, which each communicate directly with the enclosure for admission of the fluid to be filtered.

The principal advantage of the invention resides in the fact that, with one sole filter, the user of the machine has the possibility of obtaining the same filtered fluid at two different qualities, often in a first flow with a determined quality of filtration, and in a second flow, much lower than the first flow (5 to 10% of the first flow), but of quality substantially higher than said determined quality.

BRIEF DESCRIPTION OF THE DRAWINGS

The invention will be more readily understood on reading the following description with reference to the accompanying drawings, in which:

FIG. 2 is an axial section through a second variant embodiment of a filter according to the invention.

DETAILED DESCRIPTION OF THE INVENTION

Figure 1:
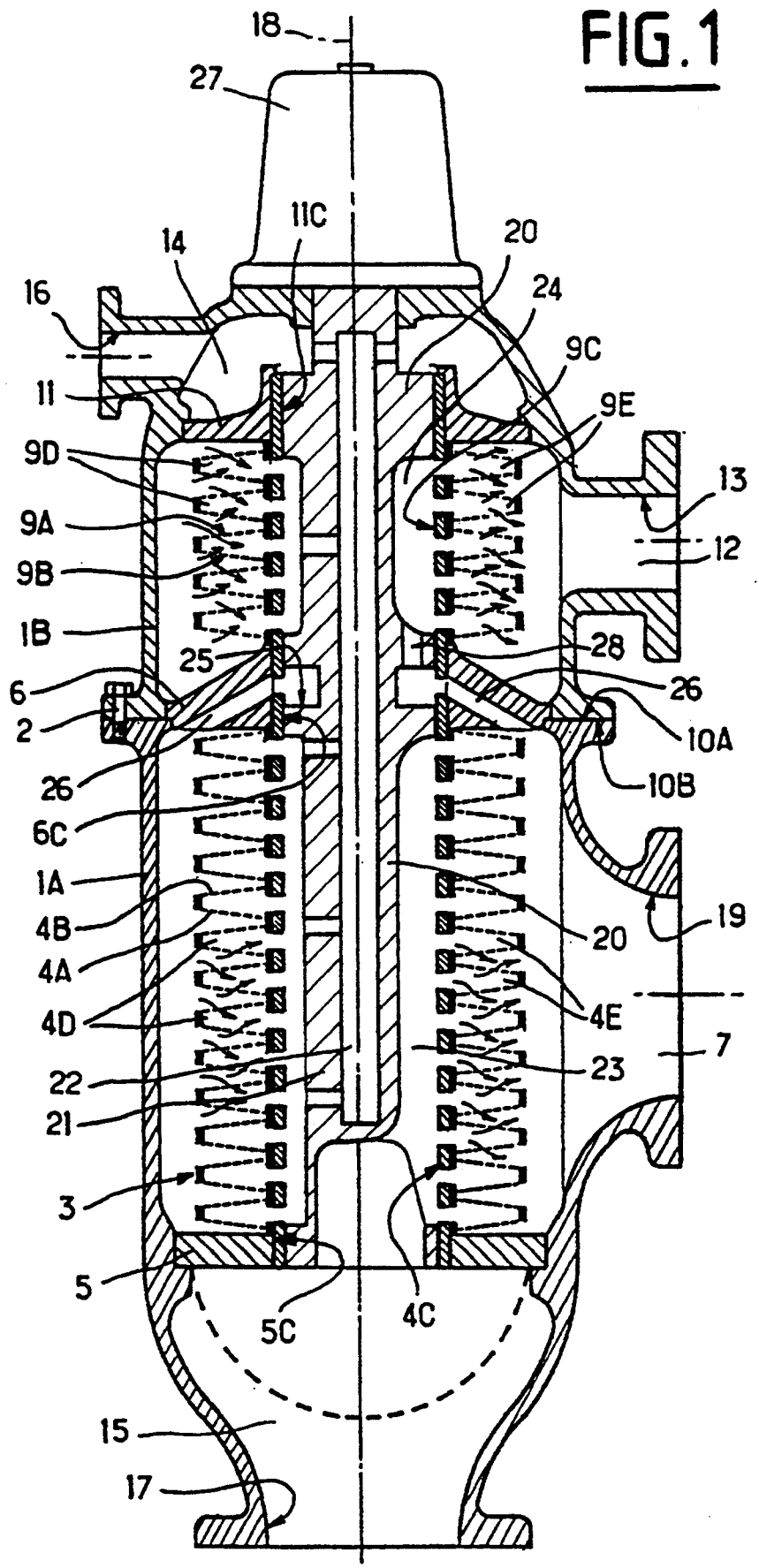
FIG. 1 is an axial section through a first variant embodiment of a filter according to the invention.

Referring now to the drawings, the filter of FIG. 1 comprises:

a filter body in two parts 1A, 1B assembled by screws 2 and forming a filter housing;

a first filtration assembly 3, constituted by a stack of filtration discs each presenting two screens 4A, 4B, said stack extending between a transverse plate 5 which constitutes the lower end thereof and fits with tightness on the inner face of part 1A of the filter body, and a transverse support 6 which constitutes the upper end thereof and fits with tightness both on the inner face of the part 1A and on that, 1B, of the filter body, in the zone of the assembly faces 10A, 10B of said parts;

a first enclosure 7 for receiving the fluid filtered by the discs 4A-4B, separated from the rest of the filter by said screens 4A, 4B, and by the transverse plate 5 and the transverse support 6, and connected to the environment outside the filter by a connection 19;

a second filtration assembly 8, constituted by a stack of filtration discs each presenting two screens 9A, 9B, said stack extending between the transverse support 6, which constitutes the lower end thereof and a transverse plate 11 which constitutes the upper end thereof and fits with tightness on part 1B of the filter body;

a second enclosure 12 for receiving the fluid filtered by the discs 9A-9B, separated from the rest of the filter by said screens 9A, 9B and by the support 6 and the plate 11, and connected to the environment outside the filter by a connection 13;

an enclosure 14 for receiving the fluid containing the impurities detached from the screens 4A, 5B, 9A, 9B during automatic and periodic operations of cleaning said screens, said enclosure 14 being located in the upper part of the filter, towards the transverse plate 11 opposite the second enclosure 12 for receiving the filtered fluid;

an enclosure 15 for admission of the fluid to be filtered, located in the lower part of the filter, towards the transverse plate 5 opposite the first enclosure 7 for receiving the filtered fluid;

a connection 16 for evacuation of the fluid contained in the enclosure 14, laden with the impurities coming from cleaning the screens;

a principal connection 17 for admission of the fluid to be filtered in the admission enclosure 15.

Each disc 4A-4B and 9A-9B comprises a central bore 4C, 9C, respectively, the various bores 4C and 9C being cylindrical and coaxial, with axis 18, in the same way as the transverse plates 5, 11 and the support 6 comprising cylindrical bores 5C, 11C and 6C, respectively, likewise coaxial, with axis 18.

Moreover, as is already known, for example by the document already cited, each disc is sectorized. A distributor 20, mounted to rotate about axis 18, fits with tightness on bores 5C, 6C, 11C and comprises an angular sector 21 of which the ends are adapted with tightness to bores 4C and 9C of the filtration discs and are capable of successively isolating each angular sector of said discs from the other sectors in the course of rotation of said distributor 20.

This distributor 20 comprises an inner conduit 22 with which communicate the internal space 4D, 9D of the sector of each disc 4A-4B, 9A-9B, respectively, isolated by the distributor, and comprises a first conduit 23 which constitutes a first connection for admission of the fluid to be filtered, communicating, on the one hand, with the enclosure 15 for admission of the fluid to be filtered, on the other hand, with the internal spaces 4E of the sectors of each disc 4A-4B other than sectors 4D. The distributor 20 also comprises a second conduit 24 which constitutes a second connection for admission of the fluid to be filtered, communicating, on the one hand, with a groove 25 made in the distributor 20, via a connecting conduit 28 also made in the distributor 20, on the other hand, with the internal spaces 9E of the sectors of each disc 9A-9B other than sectors 9D.

The internal conduit 22 of the distributor opens out in the enclosure 14 for receiving the fluid containing the impurities coming from cleaning of the screens; the groove 25 communicates with the first enclosure 7 for receiving the fluid filtered via conduits 26 made in the support 6.

Finally, a motor 27 for driving the distributor 20 in rotation is fixed on the upper part of part 1B of the body of the filter; is preferably constituted by a hydraulic motor supplied by one of the fluids contained in the filter, as is, moreover, known; and whose driving shaft is coupled to said distributor 20.

It must be specified that the numbers of discs 4A-4B, 9A-9B of the two filtration assemblies as well as the dimensions of the meshes of the screens are selected as a function of the desired flows and of the desired qualities of the filtered fluids available at the connections 13 and 19. However, according to the invention, the choice of the qualities is made so that the ratio of the calibrations of the meshes on the one hand of the screens 4A, 4B, on the other hand of the screens 9A, 9B, is at least equal to 1.4, and this in order ted attain the purpose aimed at by the invention. This corresponds, for example, to a filtered fluid, available at the evacuation connection 19, not comprising impurities having dimensions greater than 35 microns, such as the fluid for lubrifying a "Diesel" type engine, and to a filtered fluid, available at the evacuation connection 13, not comprising impurities having dimensions greater than 25 microns, such as the fluid for lubrifving the bearings of the turbo-compressor equipping said "Diesel" type engine. In this example, the flows are also very different: 200 $m^3$/hour for the fluid lubrifying a "Diesel" type engine of a determined power, and 6 to 10 $m^3$/hour for the fluid lubrifying the corresponding turbocompressor.

The filter shown in FIG. 2 comprises all the characteristics of the filter of FIG. 1, except for the following points:

the distributor 20 of the variant of FIG. 2 does not comprise a groove 25, nor a connecting conduit 28, and the support 6 does not comprise conduits 26 either;

the first conduit 23 and second conduit 24 of FIG. 1 are replaced by a single conduit 123 in FIG. 2 which communicates directly with the enclosure 15 for admission of the fluid to be filtered and with the internal spaces 4E and 9E of the sectors of the discs 4A-4B and 9A-9B other than sectors 4D and 9D.

The choices of the calibrations of the meshes of screens 4A, 4B and 9A, 9B are the same as those of the embodiment of FIG. 1.

Functioning of the filter of FIG. 1 will now be set forth.

The fluid to be filtered penetrates in the admission enclosure 15 and, via conduit 23, in spaces 4E, passes through screens 4A, 4B defining these spaces 4E, ridding itself of its impurities, and is received in the first enclosure 7. The major part of the purified fluid contained in the first enclosure 7 escapes through the connection 19 towards a first user circuit. A second part of this fluid contained in the first enclosure 7 penetrates in the spaces 4D, passing through the screens 4A-4B defining these spaces 4D in counterflow, thus cleaning said screens, and finally escaping, via conduit 22, towards enclosure 14 and the connection 16 for evacuation of this part of the fluid laden with impurities from cleaning. A third part of the fluid contained in the first enclosure 7 is directed towards conduit 24 via conduits 26 and 28 and groove 25.

This fluid, already purified, conveyed from the first enclosure 7 towards conduit 24, penetrates in the spaces 9E, passes through screens 9A, 9B defining these spaces 9E, ridding itself of certain of the impurities that it still contained and is received in the second enclosure 12. The major part of this fluid is directed, through connection 13, towards a second user circuit. The other part of the fluid contained in the second enclosure 12, about 5% of this fluid, passes through screens 9A, 9B defining spaces 9D in counter-flow, cleans these screens and escapes through conduit 22 towards enclosure 14 and connection 16 for evacuating this part of fluid laden with the impurities from cleaning.

Finally, with one sole filter, the user obtains two flows of purified fluids, available at connections 19 and 13, having two different qualities of filtration. With the filter of FIG. 1, the large impurities are all arrested by screens 4A, 4B of the first filtration assembly, screens 9A, 9B of the second filtration assembly therefore having for function only to arrest the other impurities not yet arrested by the screens 4A, 4B. Screens 9A, 9B work under good conditions, which makes it easier to obtain a satisfactory filtration.

With the filter of FIG. 2, functioning is identical, except that screens 9A, 9B must filter all the impurities and not only those which traversed screens 4A, 4B. However, the man skilled in the art can choose the number of discs 9A-9B in order to obtain the same quality of filtration of the fluid contained in the second enclosure 12, as that obtained with the filter of FIG. 1.

Solely in order to recall a known functioning, the distributor 20, driven in rotation by motor 27, successively isolates each angular sector of the discs 4A-4B and 9A-9B by means of its own angular sector 21, which allows automatic and periodic cleaning of the screens.

It should further be observed that:

the invention concerns a filter enabling two qualities of filtered fluids to be obtained, whatever the constitution of the filtration elements;

in particular, the application of the invention is not limited to the filters comprising filtration discs, and also covers filters comprising, for example, cylindrical screens, generally coaxial to axis 18;

in order to maintain good qualities of filtration and to avoid any degradation of the initial characteristics of filtration in service, it is necessary to provide a device for periodically and automatically cleaning the filtering elements of the two filtration assemblies;

there again, the invention is not limited to filters comprising a rotatable distributor 20; certain filters have cleaning devices mounted for translation parallel to axis 18; the invention is also applicable to this type of filter.

The invention is not limited to the embodiments described, but covers, on the contrary, all the variants which may be made thereto without departing from their scope nor spirit.

What is claimed is:

1. A fluid filter comprising:
   a filter body having an opening connected to a filter body enclosure for admission of a first fluid to be filtered, the first fluid to be filtered containing a fluid and residues;
   a first filtration assembly contained within the filter body having a first filtering element, the first filtering element separating the first fluid to be filtered into a stream of a first filtered fluid and first residues, the first filtering element having a first passage dimension of a predetermined calibration, the first filtration assembly further having a first receiying enclosure for receiving the first filtered fluid, the first receiving enclosure being separated from the rest of the first filtration assembly by the first filtering element;
   a second filtration assembly contained within the filter body having a second filtering element, the second filtering element separating either the first fluid to be filtered or the first filtered fluid into a stream of a second filtered fluid and second residues, the second filtering element having a second passage dimension of a predetermined calibration, the second filtration assembly further having a second receiving enclosure for receiving the second filtered fluid, the second receiving enclosure being separated from the rest of the second filtration assembly by the second filtering element; and
   a cleaning element contained within the filter body, the cleaning element having a cleaning element enclosure for receiving the first and second residues from the first and second filtering elements, the cleaning element enclosure being separated from the first and second receiving enclosures and having a permanent opening for evacuating the first and second residues,
   wherein the first and second passage dimensions of the first and second filtering elements are significantly different.

2. The fluid filter of claim 1, wherein the first filtration assembly further includes a first connection for admission of the first fluid to be filtered, the first connection being in communication with the filter body enclosure and wherein the second filtration assembly further includes a second connection for admission of part of the first filtered fluid, the second connection being in communication with the first receiving enclosure.

3. The fluid filter of claim 1, wherein the first filtration assembly further includes a first connection for admission of the fluid to be filtered and the second filtration assembly further includes a second connection for admission of the fluid to be filtered, the first and second connections communicating with the enclosure of the filter body for admission of the fluid to be filtered.

4. A fluid filter comprising:
   a filter body having an opening connected to a filter body enclosure for admission of a first fluid to be filtered, the first fluid to be filtered containing a fluid and residues;
   a first filtration assembly contained within the filter body having a first filtering element, the first filtering element separating the first fluid to be filtered into a stream of a first filtered fluid and first residues, the first filtering element having a first passage dimension of a predetermined calibration, the first filtration assembly further having a first receiving enclosure for receiving the first filtered fluid, the first receiving enclosure being separated from the rest of the first filtration assembly by the first filtering element;
   a second filtration assembly contained within the filter body having a second filtering element, the second filtering element separating either the first fluid to be filtered or the first filtered fluid into a stream of a second filtered fluid and second residues, the second filtering element having a second passage dimension of a predetermined calibration, the second filtration assembly further having a second receiving enclosure for receiving the second filtered fluid, the second receiving enclosure being separated from the rest of the second filtration assembly by the second filtering element; and
   a cleaning element contained within the filter body, the cleaning element having a cleaning element enclosure for receiving the first and second residues from the first and second filtering elements, the cleaning element; enclosure being separated from the first and second receiving enclosures and having a permanent opening for evacuating the first and second residues,
   wherein the first and second passage dimensions of the first and second filtering elements are in a ratio of 1 to at least 1.4.

5. The fluid filter of claim 4, wherein the first filtration assembly further includes a first connection for admission of the first fluid to be filtered, the first connection being in communication with the filter body enclosure and wherein the second filtration assembly further includes a second connection for admission of part of the first filtered fluid, the second connection being in communication with the first receiving enclosure.

6. The fluid filter of claim 4, wherein the first filtration assembly further includes a first connection for admission of the fluid to be filtered and the second filtration assembly further includes a second connection for admission of the fluid to be filtered. the first and second connections communicating with the enclosure of the filter body for admission of the fluid to be filtered.

* * * * *